May 1, 1923.

E. H. BUTTERFIELD ET AL

1,453,438

SIGNAL AND RECORDING METER FOR PAPER MAKING MACHINERY

Filed May 12 1919

Inventors
Edward H. Butterfield,
Ferdinand D. Otterbein,

Attorneys

Patented May 1, 1923.

1,453,438

UNITED STATES PATENT OFFICE.

EDWARD H. BUTTERFIELD AND FERDINAND D. OTTERBEIN, OF MIDDLETOWN, OHIO, ASSIGNORS TO TOM HARVEY, JR., OF MIDDLETOWN, OHIO.

SIGNAL AND RECORDING METER FOR PAPER-MAKING MACHINERY.

Application filed May 12, 1919. Serial No. 296,687.

*To all whom it may concern:*

Be it known that we, EDWARD H. BUTTERFIELD and FERDINAND D. OTTERBEIN, citizens of the United States, residing at Middletown, in the county of Butler and State of Ohio, have invented certain new and useful Improvements in Signal and Recording Meters for Paper-Making Machinery, of which the following is a specification, reference being had therein to the accompanying drawing.

This invention relates to a fundamentally new device consisting of a signal and recording meter and automatic controlling device for use in connection with paper making machinery.

The invention consists essentially of a metering instrument cooperating with the newly formed web of paper travelling over the forming, drying and finishing rollers of a paper forming machine, whereby the variable thickness of the paper will be constantly indicated on suitable signals for the guidance of the operator and will also be recorded on a suitable record, which will show any variations in the paper from any given dimension required in the paper produced.

Such records provide indisputable evidence as to the uniformity of the stock run on any job or lot of paper, as they show the degree of the variations in thickness throughout the entire quantity run. These records are carefully noted at intervals and upon the completion of the job are filed for future reference in event that questions are raised by customers or otherwise relative to the uniformity of the stock from which the record has been obtained.

The practice in paper manufacturing heretofore has been for the attendant of the machine to make frequent observations of the paper in process of formation to determine how the stock was running as to specifications. These observations are usually made by puncturing the sheet or web and calipering the paper to determine its thickness. This method is far from satisfactory for reasons well known in the paper making industry. It is not dependable because of the degree of carelessness that enters into such tests on the part of the average attendant. The tests are not made as frequently as accuracy requires, and the measurements when taken are not always accurately taken. Furthermore the punctures in the stock are commercially objectionable and altogether the method lacks conclusiveness as to the uniformity of the stock such as would be accepted by the average producer or consumer.

The advantages of the present invention are, therefore, obvious. The successful application that has been made of the metering and controlling instruments is a long step forward in this important detail of the paper making industry as will be appreciated by those experienced therein. As far as we are aware we are the first to invent, perfect and successfully apply in commercial use in the paper making industry a device of this character. We are aware, of course, that various metering instruments have been commercialized for many different uses but none have been made and applied to our knowledge having the application and functions of our instrument.

Referring to the accompanying drawings.

Figure 2:
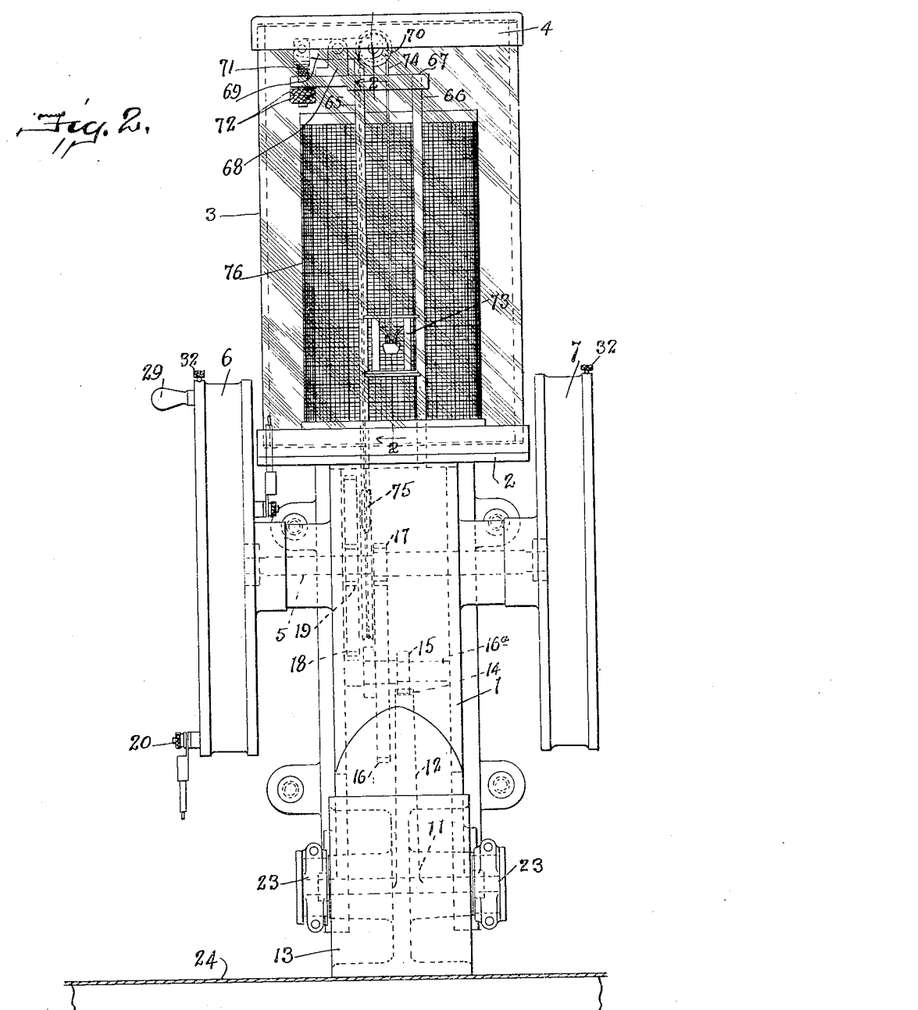
Fig. 2 is a front elevation of the instrument detached.

As best shown in Fig. 2 of the drawings the instrument consists of a suitable supporting housing 1 having secured to the upper end thereof an annular supporting base 2 serving as the lower end closure and support for the cylindrical glass tube 3, which forms an observation housing for the graphic chart upon which the measurements of the instrument are recorded, the upper end of the tube being closed by a top cover plate 4.

On opposite sides of the housing 1, supported on projecting ends of a shaft 5 and held stationary relative to the casing 1 by a key or feather 5$^a$ are indicator casings 6 and 7, having secured therein dials 8 and 9. Pivotally supported in the bottom of the housing in bearing projections 10 is a bell crank lever having arms 11 and 12; the arm 11 having secured thereto at its outer end a paper contact roller 13. The arm 12 extends upwardly within the housing 1 and has secured to the free end thereof a segment 14 which meshes with a pinion 15 secured to a shaft 16$^a$. Also secured, to the shaft 16$^a$ is a gear 16 which meshes with a pinion 17 mounted on the shaft 18$^a$. A gear 18, also supported upon the shaft 18$^a$, receives its motion from the shaft and meshes with the pinion 19 which is secured to shaft 5, the shaft having secured to its outer free ends within the casings 6 and 7, pointers or indicator hands, one of which, 20, is shown in Fig. 2.

The shafts 16$^a$ and 18$^a$ are supported in the sides of the housing 1 and the bell crank at the bottom of the housing and the contact roller 13 secured thereto are preferably mounted in roller bearings 22 and 23, respectively; the arm 11 of the bell crank being bifurcated, as shown in Fig. 2, to receive the contact roller between the projecting bearing arms thereof. The roller is held in contact with the paper web 24 by a spring 25 which is connected at one end to a pin 26 secured in the arm 11 and anchored at the other end to the bearing projection 10 by a pin 27.

Thus, it will be seen that the pivotal movements of the contact wheel 13, caused by variations in the thickness of the paper web passing thereunder will be transmitted to the indicator hands 20 and 21, through the bell crank lever and intermediate compound gearing, thus causing the hands to move synchronously with the pivotal movements of the roller, whereby the variations in the paper may thus be indicated in points or degrees on the dials 8 and 9. As here shown and as used in the practical application of the invention thus far the instruments are adjusted and the dials are graduated to show variations in the paper in points of one-thousandth of an inch.

To prevent excessive movement of the bell crank lever, and thus break the instrument or render the same out of adjustment, as might result from foreign substances, such as portions of pulp or scraps of paper, passing under the roller 13, adjustable limit stops 12$^a$ and 12$^b$ are secured in the frame of the instrument on opposite sides of the arm 12, and the arm 11 is provided with a break joint 11$^a$. Thus any movement of the wheel 13 and arm 11 in excess of the movement permitted by the limit stops 12$^a$ and 12$^b$ will be accommodated by yielding of the break-joint, the parts being restored to normal position by the tension of the spring 25 as soon as the obstructing material passes free of the roller 13.

As here shown the indicator casing 6 is further provided with an annular ring 28 provided with a handle 29 and a pointer 30 secured to the inner surface of the ring adjacent the handle and registering with the graduations on the dial 8. The annular ring is rotatably mounted in a flange 31 and is retained therein by a set screw 32 adapted to engage an annular groove 33 formed in the outer face of the ring 28. Secured to the lower portion of the ring is a webbed member of insulating material, as shown at 34 in Figs. 1 and 3 and provided with a ring portion 35 of like material, whereby the ring is made sufficiently rigid to be readily operated by the handle 29 and for the further purpose of providing suitable contact connection between the ring and the pointer 20.

Figure 1:
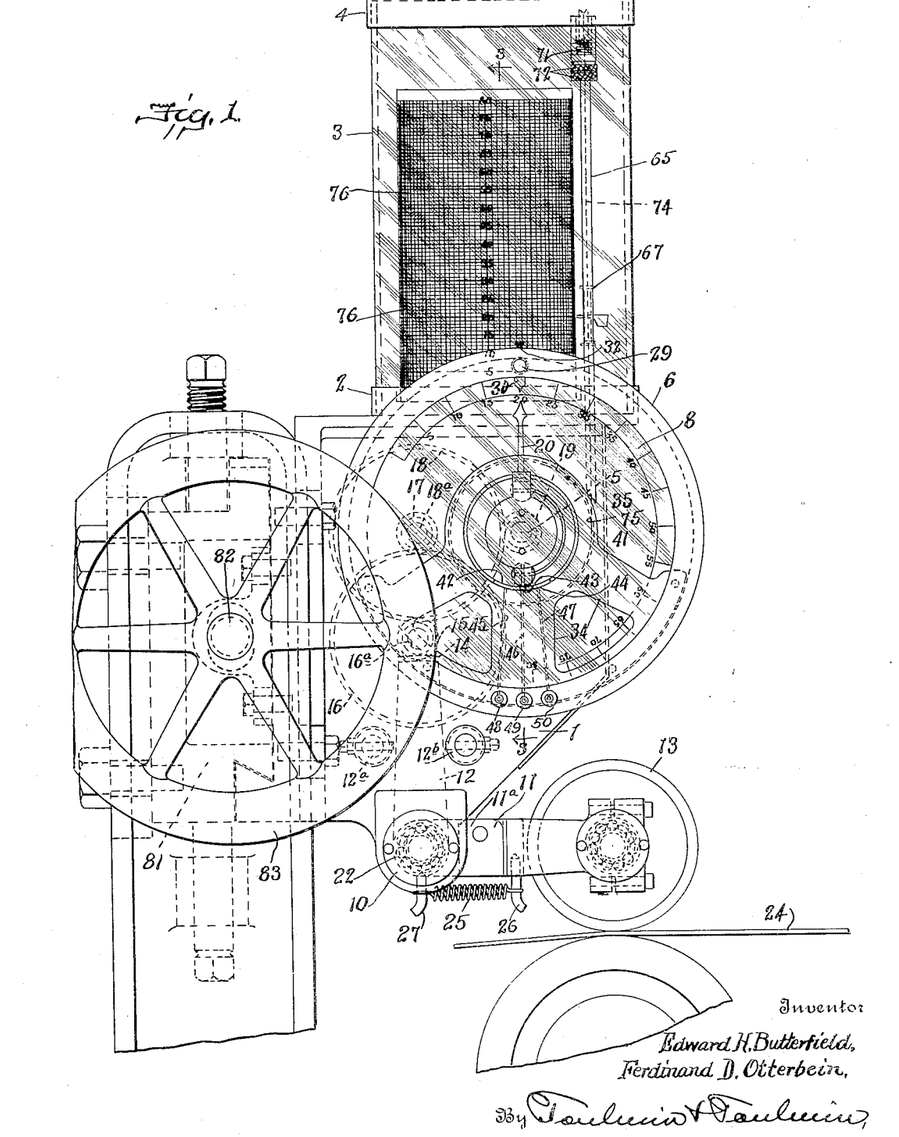
Fig. 1 is a side elevation of the improved metering device showing in detailed assembly the manner of applying the same to a paper forming machine of well known construction.
Figure 3:
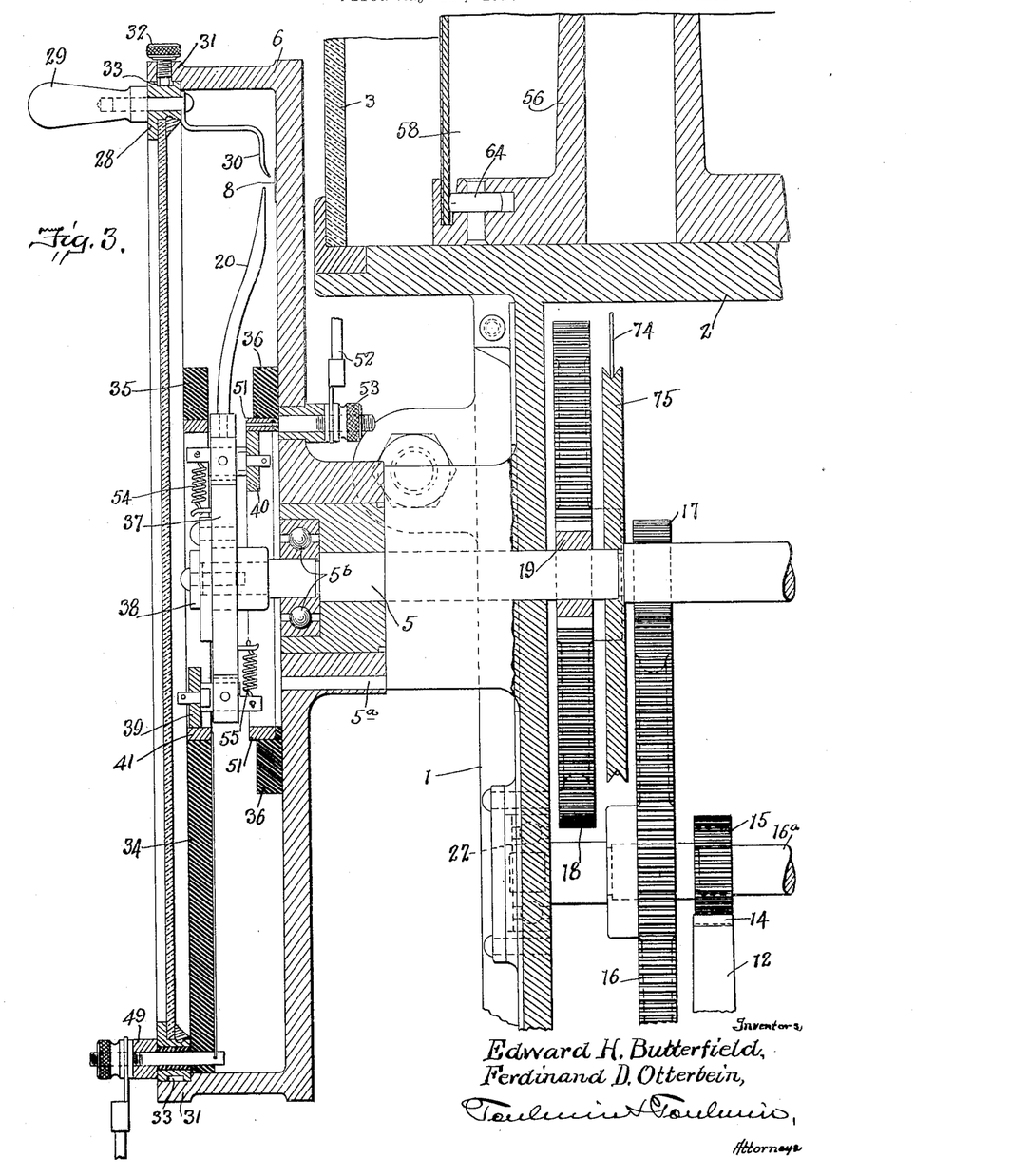
Fig. 3 is a cross sectional view taken on the line 3—3 of Fig. 1.
Figure 7:
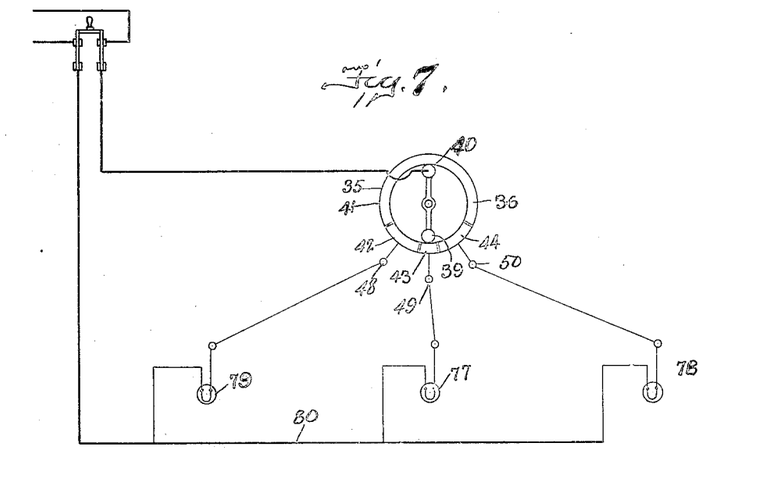
Figs. 7 and 8 are diagrammatic views showing the system of electrical wiring for the instrument.
Figure 8:
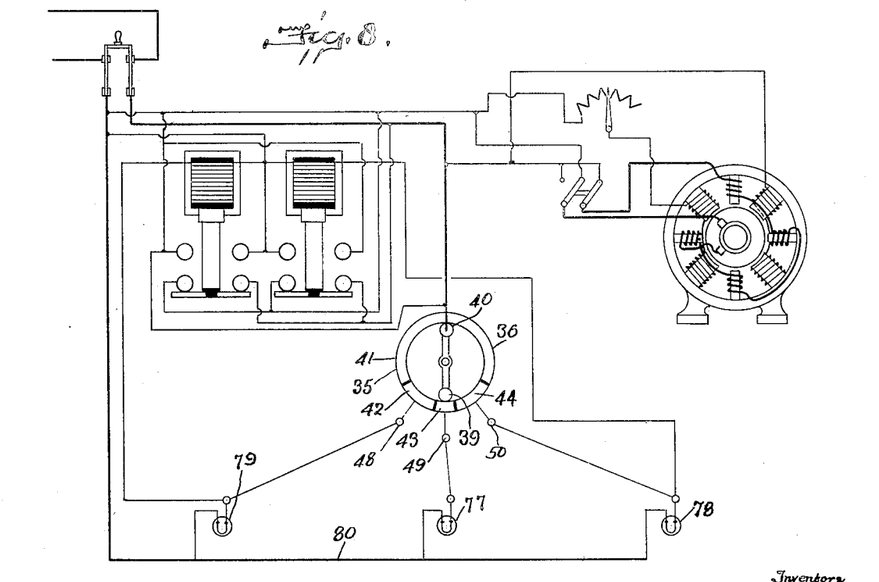

The inner wall of the indicator casing has a ring 36 of insulating material secured thereto, and the pointer 20 has a body portion 37 in which a suitable connection 38 is provided for securing the pointer to the shaft 5, a ball bearing 5$^b$ being preferably employed. Reference is made to Figs. 1, 3 and 7 which illustrate the construction about to be described. Secured to the body portion 37 at the opposite sides of its pivotal center are contact rollers 39 and 40; the roller 39 contacting with the inner surface of a bronze ring 41 secured to the ring 35 and adapted to contact, with the variable fluctuation of the pointer 20, with any one of three insulated contact points 42—43 and 44 located in the ring 41. These contact points 42, 43, 44 comprising segments of the ring 41 proper are segments which are insulated from each other by any suitable insulation and it is to be understood that by contact points, we designate these insulated sections of the ring 41, and the wires 45, 46 and 47 from these points leading respectively to binding posts 48, 49 and 50 located in the annular ring 28.

The roller 40 contacts with the inner surface of a bronze ring 51 which is connected to a lead wire 52 through which electrical current may be supplied from any suitable source by a binder post 53, thus completing the electrical connection between the lead wire 52 and the connections 48, 49 and 50, the purpose and further operation of which will presently be described.

The rollers 39 and 40 are preferably pivotally mounted in the member 37 and are normally held in contact with the rings 41 and 51, respectively, by tension springs 54 and 55, thus providing for compensation for wear or variation of adjustment and insuring proper contact of the rollers with the rims.

Disposed above the indicator mechanism above described is the recording meter instrument consisting of the vertical glass cylinder 3 with its end closures 2 and 4. Supported upon the base part 2 and extending upwardly therefrom, substantially centrally of the cylinder, is a supporting pedestal 56 upon which any suitable clock mechanism 57 may be supported. Also supported upon the base portion of the pedestal and enclosing the pedestal and the clock mechanism thereon is a cylindrical casing 58 which is connected at its upper end to the clock by an annular end plate 59, secured to the main drive shaft 60 of the clock by means of a set screw 61. A spring plate 62 and adjusting nut 63 are preferably employed in connection with the clock shaft 60 to adjust the cylinder 58 longitudinally. The lower end of the cylinder rotates freely about the base of the pedestal, the rollers 64 secured in the base acting to minimize friction between the parts.

Supported on two parallel tubes 65 and 66 (see Figure 2), extending upwardly from the base plate 4, longitudinally through the glass cylinder 3 and adjacent to the periphery of the cylinder 58, is a frame 67 having an upwardly extending bracket 68 in which is pivoted an arm 69 which supports at its free end a grooved wheel 70, its opposite end being adjustably secured to the frame 67 by means of a threaded bolt 71 and lock nuts 72. Slidably supported upon the tubes 65 and 66 and guided thereby in its longitudinal movement thereon is a carriage 73 which has secured to the upper end thereof a like cable 74 which passes over the grooved wheel 70, extends through the tube 65 and is secured at its opposite end to a grooved wheel 75 secured on the shaft 5 of the indicator mechanism.

Thus it will be seen that any variable movement of the paper contact wheel 13 transmitted to the indicator shaft and dial hands 20 will also be transmitted through the cable connections to the carriage 73, the carriage being positively moved by the cable in the upward direction and moved by its own weight downwardly.

Figure 9:
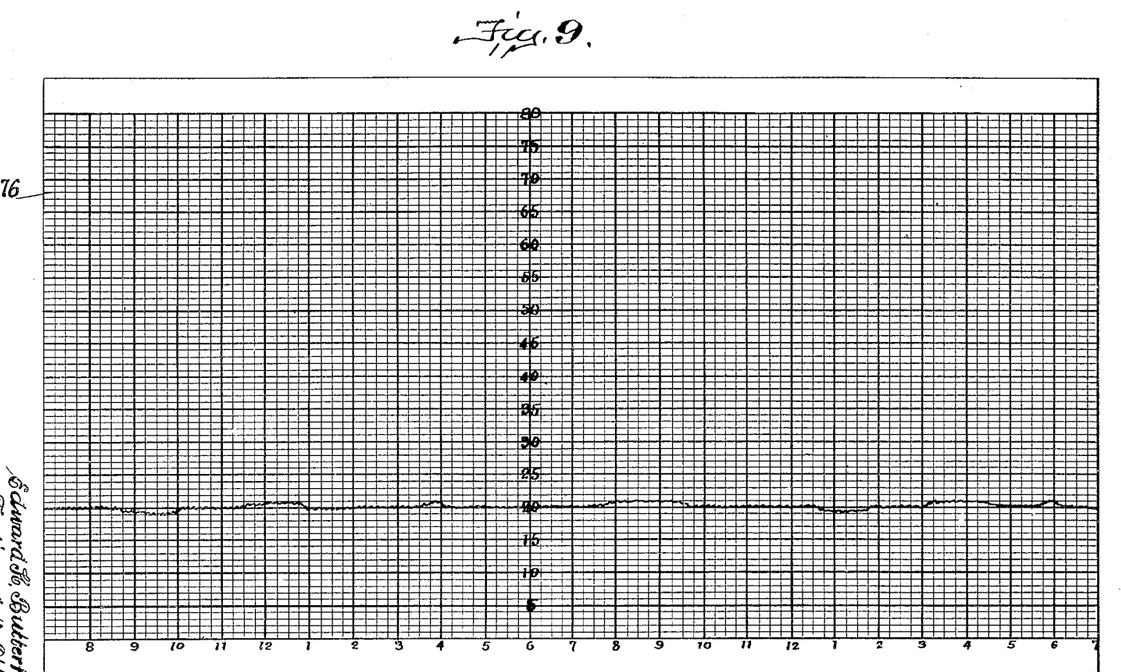
Fig. 9 is an illustrative view of a graphic chart produced on the machine.
Figure 10:
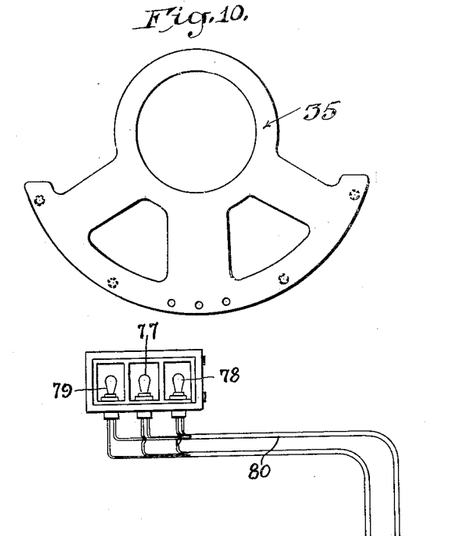
Fig. 10 is a plan view of the ring portion 35.

To record the variations in the paper as transmitted to the instrument by the contact wheel 13 the carriage 73 is provided with a suitable recording pen or stencil and the cylinder 58 may be provided with any suitable record sheet, preferably as here shown a graphic chart 76 drawn to a scale corresponding with the graduations on the dials 8 and 9. As best shown in Fig. 9 of the drawings the heavy cross lines of the graphic chart illustrated represent hours, and the light cross lines minutes or fractions of hours. The heavy longitudinal lines of the chart represent divisions of five-thousandths, and the light longitudinal lines represent divisions of one-thousandth. The variable line on the chart represents a record made by the metering instrument and shows the variable thickness of the paper from which the record was obtained.

Figure 4:
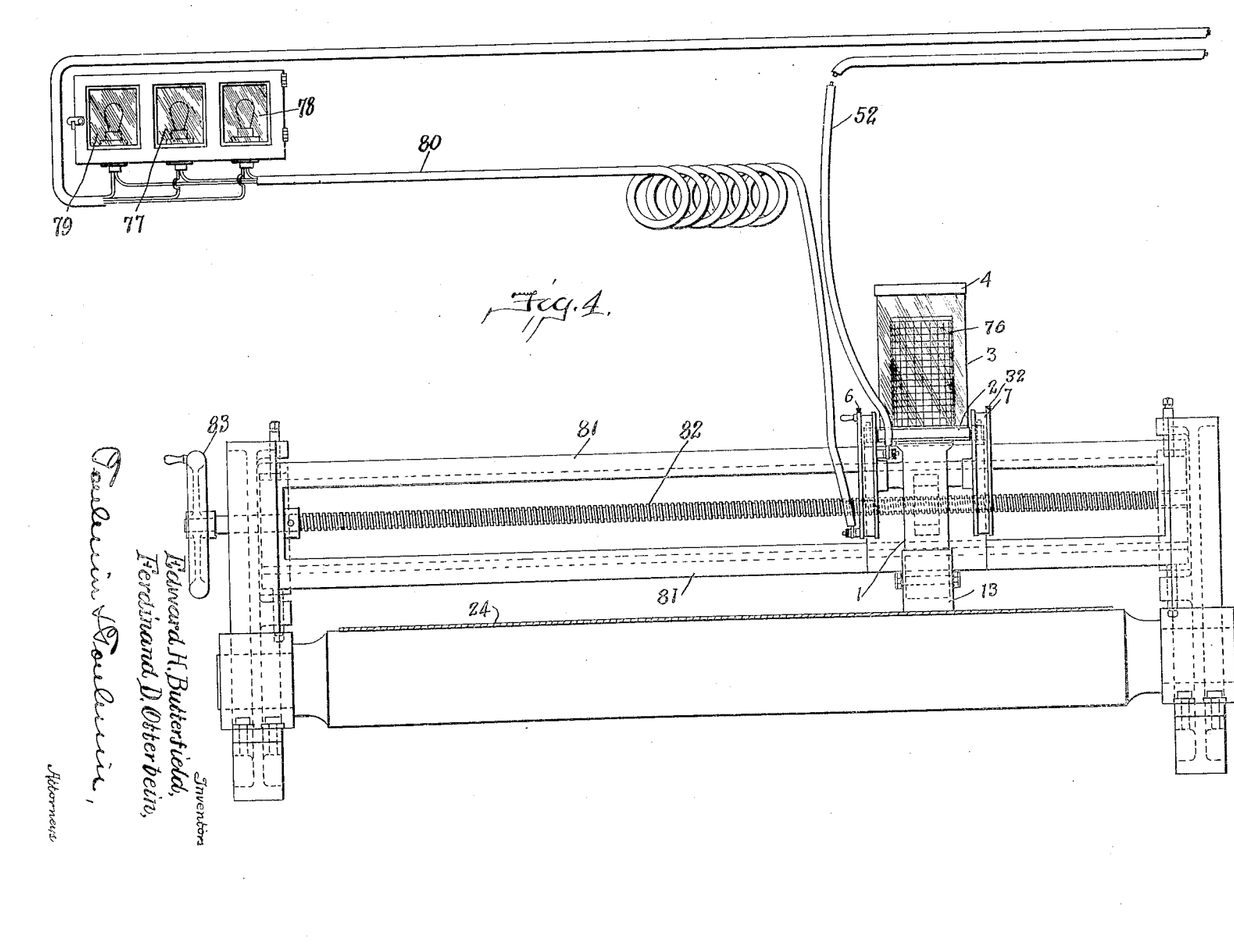
Fig. 4 is a front elevation of the instrument applied to a machine and showing its relation to the paper web; also showing one form of signal that may be employed therewith.
Figure 5:
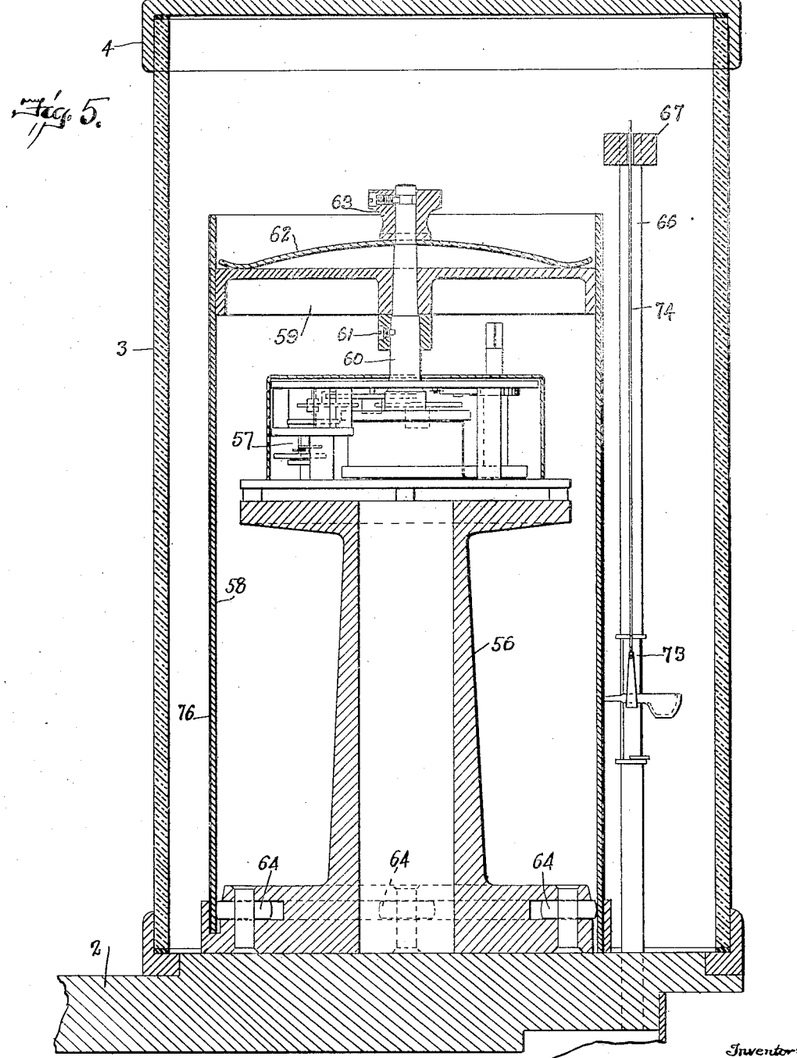
Fig. 5 is a cross sectional view taken on the line 5—5 of Fig. 2.

As best shown in Fig. 4 of the drawings a visual signal consisting of white, red and blue lights is also preferably used in connection with the metering instrument to indicate to the attendant or foreman in charge of the presses how the paper stock is running. As here shown, the central light 77 is the white light; the one to the right 78 is the red light, and the one to the left, 79, is the blue light. These lights are controlled, respectively, from the three contact points 42, 43 and 44 through wire connections 80 and serve therefore to show at a glance whether the paper is running normal to specifications, which is indicated by the white light or heavier than normal, which is indicated by the red light, or lighter than normal, which is indicated by the blue light.

When a job of paper is first put on the machine the pointer 30, carried by the annular ring 28, is moved to the numeral on the dial 8 corresponding in thousandths to the specified thickness of the paper. When the paper web is formed and passes under the contact roller 13 the pointers 20 and 21 on the respective dials 8 and 9 will be caused to register with the position of the pointer 30 as soon as the paper reaches the normal thickness required and will continue to so register as long as the normal or mean thickness of the paper is maintained.

In this position of the hand 20 the roller 39 is in contact with the connection 43 and the white light is shown. When the thickness of the paper varies sufficiently above normal to cause the hand 20 to move in advance of the pointer 30 and bring the roller 39 in contact with the connection 42 the red light will be shown, and when the hand recedes from the pointer 30 and the roller contacts with the connection 44 the blue light will be shown. If the hand moves in either direction sufficiently to advance the roller 39 beyond the contacts 42 and 44 no lights will be shown and it will be understood by the operator that the paper is running outside the allowed limits.

The instruments may be adjusted to any required limits. As applied in the practical use of the instruments thus far the limits allowed in either direction, above and below normal, have been approximately ten-thousandths, but this may be reduced to the very close limits of one-thousandths from normal, and may, of course, be increased indefinitely, the whole adjustment being controlled by the proximity to each other of the contacts 42, 43 and 44.

As further shown in Fig. 4 the metering instrument is preferably mounted in relation to the machine in a manner that will permit the contact roller 13 to engage the web of paper at any point intermediate its edges. As here shown such an arrangement may consist of a supporting cross frame 81 secured to the main frame of the press in any suitable manner and upon which the metering instrument is slidably mounted. As shown in the figure the instrument may be moved back and forth, transversely of the paper, by a screw shaft 82 connected thereto in any suitable manner; the screw shaft having bearings in the side frames of the press and having secured to one end thereof an operating hand wheel 83.

Figure 6:
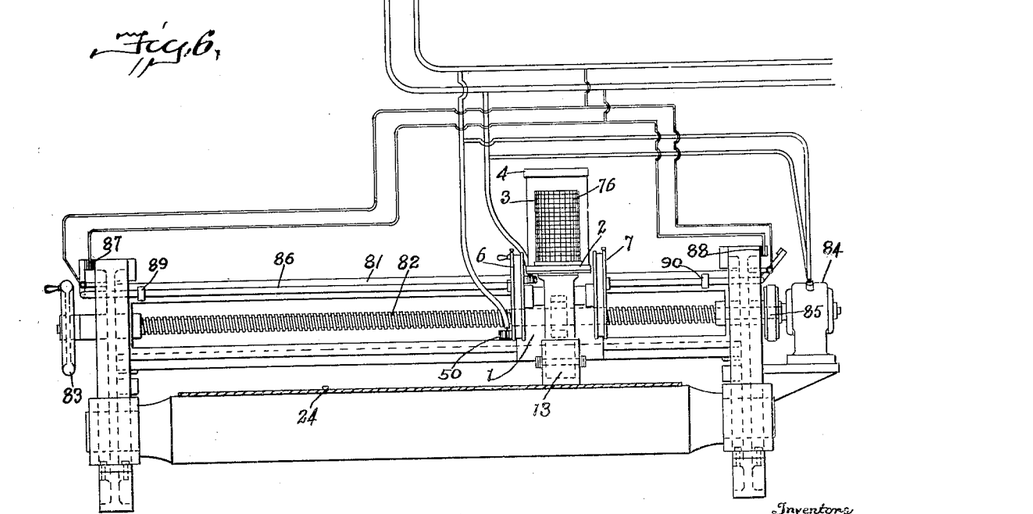
Fig. 6 is an elevation of the instrument applied to the paper machine, and connections for moving the instrument transversely of the paper web.

The preferred arrangement for operating the screw shaft 82 and moving the instrument transversely of the paper is the construction shown in Fig. 6 of the drawings which serves to impart continuous lateral movement to the instrument, thereby causing the measuring wheel to move from side to side of the paper, producing meter indications and a record covering the entire width and length of the paper.

As here shown the arrangement for moving the instrument laterally across the paper consists in connecting the screw shaft 82 to an interpolar motor 84 in circuit with any suitable source of electrical current. The motor may be connected to the screw shaft in any suitable manner, as by a belt 85; a shift rod 86 being employed to cooperate, respectively, with contacts 87 and 88 to govern the direction of movement of the motor, the movements of the instrument in opposite directions by engaging the collars 89 and 90 serving to shift the rod 86 to open and close the contacts.

From the foregoing detailed description the construction and operation of our instrument will be apparent and the advantages resulting from its use will be understood and appreciated by those experienced in paper manufacturing. The light signals and dial indicators are effective means whereby the uniformity or lack of uniformity in the run of the paper may be constantly known and any required adjustments may be made promptly to maintain the weight or thickness of the paper within the required limits. The graphic chart produced by the instrument is an indisputable record of the measurements in thickness of the paper to which it relates and is conclusive evidence both to the manufacturer and to the user that the variations in the paper agree with the measurements indicated on the chart, and the frequent claims for adjustment and contentions arising therefrom are overcome.

In the practical application of our invention we have found it to be of material advantage under certain conditions of operation to use a number of the instruments on the same machine, preferably one at each end of the machine, the wet end and finishing end, respectively. On a very large machine one or more instruments may also be used advantageously intermediate the ends of the machine. In such an arrangment only one instrument, preferably the one at the wet end of the machine, is provided with the connections for automatically controlling the mechanism governing the thickness of the paper, the instruments being alike in other respects.

By such an arrangement the relative thickness in variations of thickness of the paper will at all times be indicated on the dials of the instrument and the different signals, and the graphic records produced at the different steps of the operation will be conclusive evidence of the uniformity or lack of uniformity of the finished stock and will serve to avoid or as a basis to adjust differences or questions arising relative to the paper from which the records have been obtained.

As above stated, as far as we are aware, we are the first to evolve a paper metering device of the character here shown. We desire to claim broadly, therefore, the essential features of the invention without limitation to the specific construction and application of the invention here shown except as broadly defined and comprehended in the appended claims.

Having thus fully described our invention, what we claim as new and desire to secure by Letters Patent, is:—

1. In a device of the character described, the combination, a member movable transversely of a strip of paper movable thereunder and adapted to contact with the surface thereof, means to move said member transversely during the operation of the machine, a graduated dial, a pointer cooperating therewith and adapted to be moved to predetermined fixed positions relative thereto, and another pointer disconnected from the first mentioned pointer cooperating with the dial and operable by said member whereby the variations in thickness of the paper will be indicated on said dial.

2. In a metering device movable transversely of a strip of paper traversed thereby and having a member contacting with the surface thereof, means to move said member transversely during the operation of the machine, a graduated dial, a pointer cooperating therewith and adapted to be moved to predetermined fixed positions relative thereto, and another pointer disconnected from the first mentioned pointer cooperating with the dial and operable by said member, whereby the variations in thickness of the paper will be indicated on said dial.

3. In a metering device movable alternately from side to side of a strip of paper traversed thereby and having a member contacting with the surface thereof, a graduated dial, a pointer cooperating therewith and adapted to be moved to predetermined fixed positions relative thereto, and another pointer disconnected from the first mentioned pointer cooperating with the dial and operable by said member, whereby the variations in thickness of the paper will be indicated on said dial.

4. In a metering device movable transversely of a strip of paper traversed thereby to a succession of positions relative thereto and having a member contacting with the surface thereof, a graduated dial, a pointer cooperating therewith and adapted to be moved to predetermined fixed positions relative thereto, and another pointer disconnected from the first mentioned pointer cooperating with the dial and operable by said member, whereby the variations in thickness of the paper will be indicated on said dial.

5. In a device of the character described, the combination, a member having a graduated dial thereon, a pointer adapted to be varied in position opposite the dial, means to vary the position of said pointer opposite the dial in accord with the momentary thickness of a strip of paper passing through the device, and means to reciprocate said member transversely of the strip whereby indications are obtained of the variations of the average thickness of said paper throughout its width.

6. In a device of the character described, the combination, a member adapted to contact with a strip of paper movable thereunder, a graduated dial, a pointer cooperating with the dial and operable by said member, whereby the variations in thickness of the paper will be indicated on said dial, and a plurality of signal lights in different colors operable from contacts made by the variable movements of said pointer.

7. In a device of the character described, the combination, a member adapted to contact with a strip of paper movable thereunder, a graduated dial, a pointer cooperating with the dial and adapted to be moved to predetermined positions relative thereto, a second pointer cooperating with the dial and operable by said member, whereby the variations in thickness of the paper will be indicated on said dial, and a plurality of signal lights in different colors connected to contact points having predetermined positions relative to the first pointer and rendered operable by the movements of the second pointer.

8. In a device of the character described, the combination, a member adapted to contact with a strip of paper movable thereunder, a graduated dial, a pointer cooperating with the dial and adapted to be moved to predetermined positions relative thereto, a second pointer cooperating with the dial and operable by said member, whereby the variations in thickness of the paper will be indicated on said dial, and a plurality of signal lights connected to contacts movable with the first pointer and rendered operable by the movements of the second pointer.

9. In a device of the character described, the combination, a member adapted to contact with a strip of paper movable thereunder, and a plurality of signal lights in different colors rendered operable intermittently by the variable movements of the contact member to indicate the mean thickness and plus and minus limits of said paper.

10. In a device of the character described, the combination, a member adapted to contact with a strip of paper movable thereunder, and a plurality of signal lights in different colors connected to contact points arranged in fixed relation to each other and rendered operable intermittently by the variable movements of said contact member.

11. In a device of the character described, the combination, a member adapted to contact with a strip of paper movable thereunder, an indicator, a recording instrument, and a plurality of signals all coordinated with each other and variably operable by the movements of the contact member to indicate, signal and record the mean thickness and plus and minus limits of said paper.

12. In a device of the character described, the combination, a member adapted to contact with a strip of paper movable thereunder, an indicator, a recording instrument, and a plurality of signals all coordinated with each other and variably operable by the movements of the contact member, whereby the running thickness of said paper will be constantly indicated, signaled and recorded.

13. In a device of the character described, the combination, a member adapted to contact with a strip of paper movable thereunder, an indicator, a recording instrument, and a plurality of signal lights in different colors all coordinated with each other and variably operable by the movements of the contact member, whereby variations in the thickness of said paper will be indicated and recorded and predetermined limits of variation will be simultaneously signaled.

14. In a device of the character described, the combination, a member adapted to contact with a strip of paper movable thereunder, a plurality of signal lights in different colors variably operable by the movements of the contact member, whereby predetermined limits of variation in the thickness of the paper will be indicated by said lights.

15. In a device of the character described, the combination, a member adapted to traverse longitudinally and transversely a strip of paper movable thereunder, a recording instrument, and a plurality of signals for each machine coordinated with each other and operable by the movements of the contact member, whereby variations in the thickness of the paper will be recorded and predetermined limits of variation will be constantly and differentially indicated.

16. In a device of the character described, the combination, a member adapted to traverse longitudinally and transversely a strip of paper movable thereunder, and a plurality of signals for each machine connected to contact points located in predetermined positions relative to each other and rendered operative by the movements of said contact member, whereby variations in said paper within predetermined limits will be constantly and differentially indicated.

17. In a device of the character described, the combination, a pivoted arm having a roller adapted to contact with a strip of paper movable thereunder, an indicator casing having a graduated dial supported therein, an annular ring rotatably supported in said casing and having a pointer adapted to be moved by rotation of said ring to predetermined positions relative to said dial, and a second pointer cooperating with the dial and controlled by the pivotal movements of said arm, whereby the variable thickness of said paper will be indicated.

18. In a device of the character described, the combination, a pivoted arm having a roller adapted to contact with a strip of paper movable thereunder, an indicator casing having a graduated dial supported therein, an annular ring rotatably supported in said casing and having a pointer adapted to be moved by rotation of said ring to predetermined positions relative to said dial, and a second pointer cooperating with the dial, normally registering with the first pointer and controlled by the pivotal movements of said arm, whereby the variable thickness of said paper will be indicated.

19. In a device of the character described, the combination, a pivoted arm having a roller adapted to contact with a strip of paper movable thereunder, an indicator casing having a graduated dial supported therein, a plurality of signal lights, an annular ring rotatably supported in said casing and having contacts connected to said lights located therein, and a pointer cooperating with the dial and said contacts and controlled by the pivotal movements of said arm, whereby said lights will be differentially operated to indicate limits of variation in thickness of the paper.

20. In a device of the character described, the combination, a pivoted arm having a roller adapted to contact with a strip of paper movable thereunder, an indicator casing having a graduated dial supported therein, a plurality of signal lights, a fixed electrical contact located in the walls of said casing, an annular ring rotatably supported in said casing and having a plurality of contacts therein connected to the stationary contact and said lights, and a pointer cooperating with the dial and said contacts and controlled by the pivotal movements of said arm, whereby said lights will be differently operated to indicate limits of variation in thickness of the paper.

21. In a device of the character described, the combination, a pivotal arm having a roller adapted to contact with a strip of paper movable thereunder, a transparent casing having a vertical cylinder rotatably supported therein, a clock-movement located within the interior of the cylinder to actuate said cylinder, a chart secured to the periphery of said cylinder and having graduations thereon indicating units of time, and other graduations indicating units of dimension, and a device suspended within and movable longitudinally of the cylinder by the pivotal movements of said arm, and having a recording instrument contacting with said chart whereby the variations in thickness of said paper are recorded during intervals of time indicated on said chart.

22. In a device of the character described, the combination, a pivoted arm having a roller adapted to contact with a strip of paper movable thereunder, a casing having a vertical cylinder rotatably supported therein, a clock movement actuating said cylinder, a chart secured to the periphery thereof, parallel guides, and a device movable thereon longitudinally of the cylinder by the pivotal movements of said arm and having a recording instrument contacting with said chart, whereby the variations in thickness of said paper are recorded.

23. In a device of the character described, the combination, a pivoted arm having a roller adapted to contact with a strip of paper movable thereunder, a casing having a vertical cylinder rotatably supported therein, a clock movement actuating said cylinder, a chart secured to the periphery thereof, a guide, and a device operable thereon longitudinally of the cylinder by a cable interposed between the device and said arm and having a recording instrument contacting with said chart, whereby the pivotal movements of said arm are recorded thereon.

24. A metering instrument having a member adapted to traverse the surface of a sheet of paper movable thereunder, a plurality of parallel guides disposed transversely of the paper supporting said instrument, and means to move the instrument from side to side of the paper on said guides, whereby the thickness of the paper may be measured.

25. A metering instrument having a member adapted to traverse the surface of a sheet of paper movable thereunder, guides disposed transversely of the paper supporting said instrument, a screw shaft adapted to move the instrument on said guides to any one of a plurality of positions relative to the surface of the paper, whereby the thickness of the paper throughout its length and breadth may be measured.

26. A metering instrument having a member adapted to traverse the surface of a sheet of paper movable thereunder, means to move the instrument from side to side of the paper, and a motor in circuit therewith, whereby said means will be automatically actuated.

27. A metering instrument having a member adapted to traverse the surface of a sheet of paper movable thereunder, means consisting of a screw shaft and suitable connections to move the instrument from side to side of the paper, and a motor in circuit with said means, whereby said means will be automatically actuated.

28. A plurality of metering devices having means to indicate measurements, applied to a paper forming machine, having members respectively adapted to contact with a web of paper formed on said machine, whereby the thickness of the paper at different steps of the operation will be simultaneously indicated.

29. A plurality of metering devices having means to indicate and record measurements, applied to a paper forming machine, having members respectively adapted to contact with a web of paper formed on said machine, whereby the relative thickness of the paper at different steps of the operation will be indicated and recorded on the different devices.

30. A plurality of metering devices having means to indicate measurements, applied to a paper forming machine, having members respectively adapted to contact with a web of paper formed on said machine, whereby the variations in the thickness of the paper at different steps of the operation will be constantly and differentially indicated.

31. A plurality of metering devices having means to indicate and record measurements, applied to a paper forming machine, having members respectively adapted to contact with a web of paper formed on said machine, whereby the variations in the thickness of the paper at different steps of the operation will be continuously and differentially indicated and recorded.

In testimony whereof, we affix our signatures.

EDWARD H. BUTTERFIELD.
FERDINAND D. OTTERBEIN.